June 11, 1968  C. LUDWIG  3,387,721
BUCKET CHAIN CONVEYOR
Filed Feb. 4, 1966  3 Sheets-Sheet 1

INVENTOR.
CARL LUDWIG
BY
McNENNY, FARRINGTON, PEARNE & GORDON
ATTORNEYS

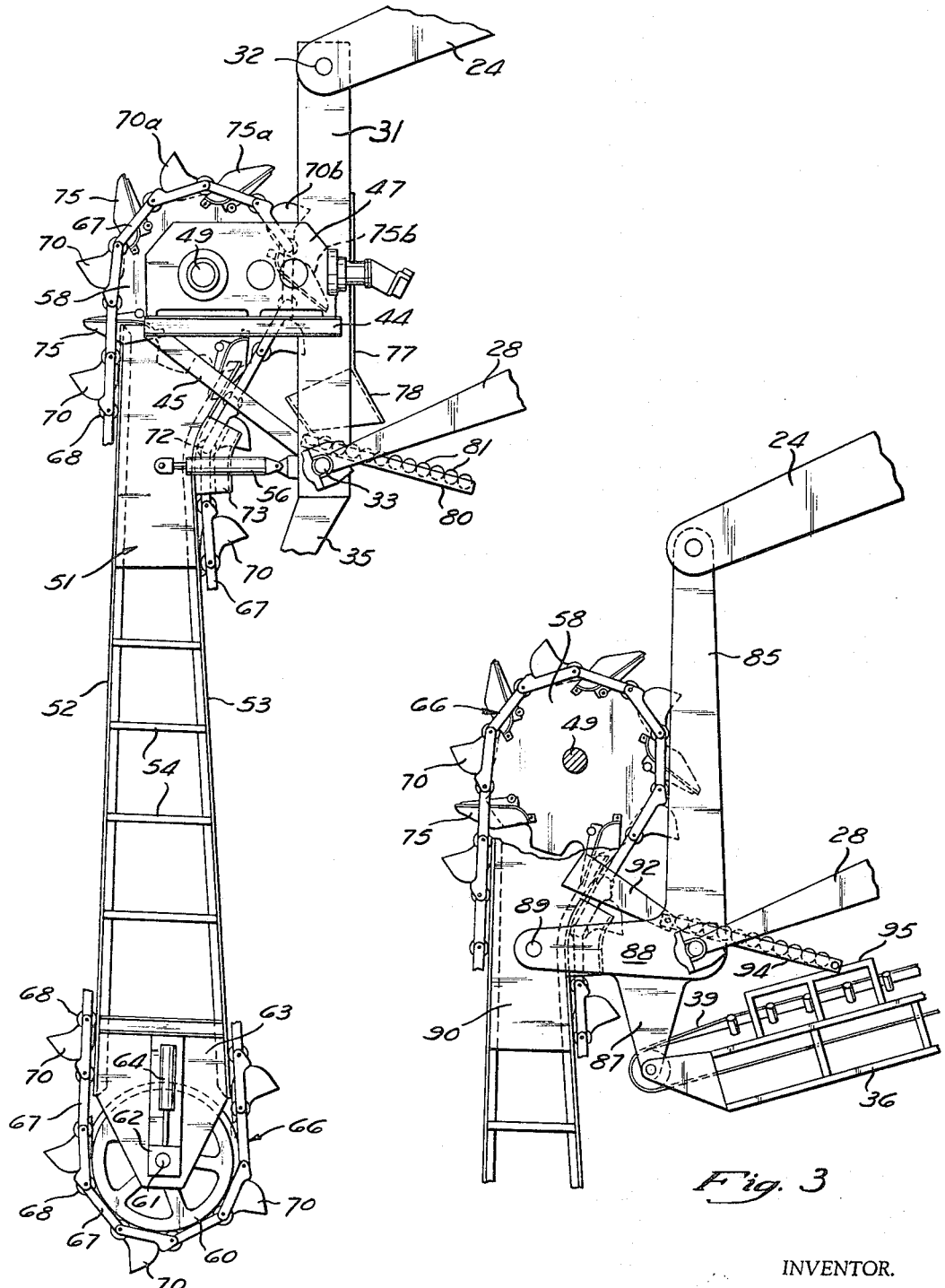

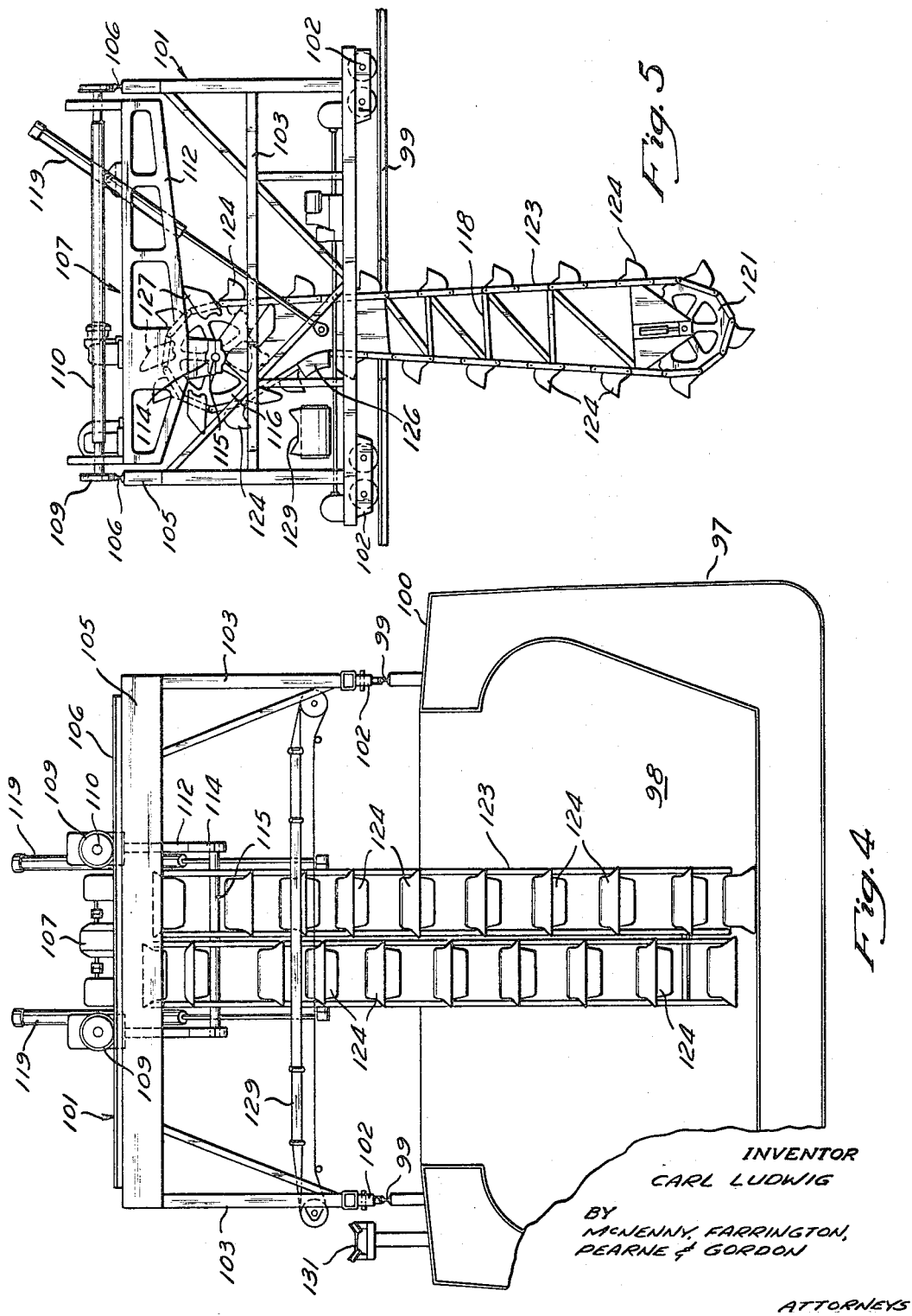

United States Patent Office 3,387,721
Patented June 11, 1968

3,387,721
BUCKET CHAIN CONVEYOR
Carl Ludwig, Cleveland, Ohio, assignor to McDowell-Wellman Engineering Co., Cleveland, Ohio, a corporation of Ohio
Filed Feb. 4, 1966, Ser. No. 525,260
10 Claims. (Cl. 214—14)

ABSTRACT OF THE DISCLOSURE

A bucket elevator unloader for bulk cargo vessels is disclosed. Lateral and transverse mobility with respect to the vessel are achieved by both dock and vessel mounted trolley embodiments. An endless chain bucket elevator is journalled on a pivoting digging ladder having rigid guides and rollers to maintain the motion of the chain with buckets oriented to facilitate side ladder digging. Upper sprocket mounted buckets are provided to direct the load discharge to a conveyor system for uninterrupted unloading. The dock mounted embodiment incorporates a parallelogram linkage for positioning of the digging ladder. The bucket chain elevator may also be vessel mounted.

---

This invention relates generally to bulk material handling systems and more particularly to bucket conveyors suitable for removing bulk material vertically from deep contains such as the holds of bulk cargo vessels.

In recent years, bulk cargo vessels have been increasing steadily in size to allow for more economical shipping costs as a result of the increased load capacity. However, this increased capacity has resulted in increased unloading times which have tended to offset some of the economies resulting from the increased capacity. This is particularly true in the case of certain bulk materials which produce unloading problems because of their density or tendency to pack hard in the holds. Such bulk materials such as iron ore, salt and crushed stone have in the past required specialized unloading equipment generally utilizing clam shell buckets and the like for removing the material. In addition, such clam shell buckets are not generally able to reach all of the corners of the hold so that it is still necessary that the material from the corners be moved into the center of the hold either by hand or by use of machinery such as bulldozers which can be lowered into the hold for cleanup purposes.

Thus, while there has been a need for increased speed and versatility in unloading machinery, there has also been a desire to minimize the cost of such improvements by utilizing as much as possible some of the existing machinery with modifications, rather than building separate completely new facilities. One particular example of this has been the Hulett unloader which has been widely used for unloading iron ore and similar materials. Because in the Hulett unloader it is necessary to lower the bucket leg to dig into the material in the hold, after which the bucket leg is raised and the trolley is moved to the rear so that the contents of the bucket may be dumped, the cycle time has necessarily been slow compared to continuous unloading equipment, but its use has continued because of its superior abilities, in handling dense and hard packed material.

It is therefore a prinicpal object of this invention to provide a novel bucket chain conveyor adapted to remove material from a deep container or cargo vessel hold and transfer the material continuously onto a conveyor.

It is a further object of this invention to provide a bucket chain conveyor as set forth in the preceding object in which there is a minimum change of direction of the material as it is directed downwardly after the upper end of the bucket chain travels onto a conveyor moving either longitudinally or transversely while the longitudinal axis of the bucket chain conveyor ladder is substantially vertical and which is operable when the ladder is tilted in either direction from the vertical position.

It is another object of this invention to provide in a bucket chain conveyor buckets attached to the upper sprocket which cooperate with the buckets on the bucket chain to receive material and retain it over a portion of the cycle of rotation of the upper sprocket and release the material only after a predetermined amount of downward movement of the bucket chain over the upper sprocket to retain full control over the material being discharged and allow it to be discharged directly onto a conveyor.

It is a further object of this invention to provide a novel bucket chain conveyor which is readily adapted to use by conversion of existing Hulett unloaders with a minimum change in the existing equipment.

In brief, the foregoing objects and advantages are accomplished according to the preferred embodiments of the present invention as shown in the drawings which utilize a vertically suspended ladder or leg having sprockets at the top and bottom thereof which support an endless chain having buckets rigidly secured thereto. The upper sprocket is of relatively large diameter and carries another set of buckets secured thereon which cooperate with the buckets on the bucket chain so that as the buckets on the bucket chain rotate as they pass the top of the sprocket, material is dumped into the sprocket buckets which temporarily retain the material. After further downward movement of the chain bucket the material is completely emptied from the chain bucket onto the sprocket bucket which in turn then discharges the material onto a conveyor. Guides are provided so that immediately beneath the upper sprocket, the chain moves inwardly or toward the ascending side to a point adjacent the axis of rotation of the upper sprocket to allow the receiving conveyor to extend underneath the discharging buckets and prevent spillage of the material.

Further objects and advantages of this invention will readily become apparent to those skilled in the art upon a complete understanding of the invention as disclosed in the illustrated embodiments and described in the following detailed description.

In the drawings:

FIGURE 2 is an enlarged side elevational view of the bucket leg shown in FIGURE 1;

FIGURE 3 is an enlarged fragmentary elevational view of an alternative embodiment of the bucket chain conveyor leg for use with a modified Hulett type unloader;

FIGURE 4 is a fragmentary cross sectional view taken transverse to the longitudinal axis of a ship showing a bucket chain conveyor leg according to the present invention mounted on a gantry for adapting this invention to a self-unloading bulk cargo vessel; and FIGURE 5 is a side elevational view of the bucket ladder and gantry shown in FIGURE 4.

Figure 1:
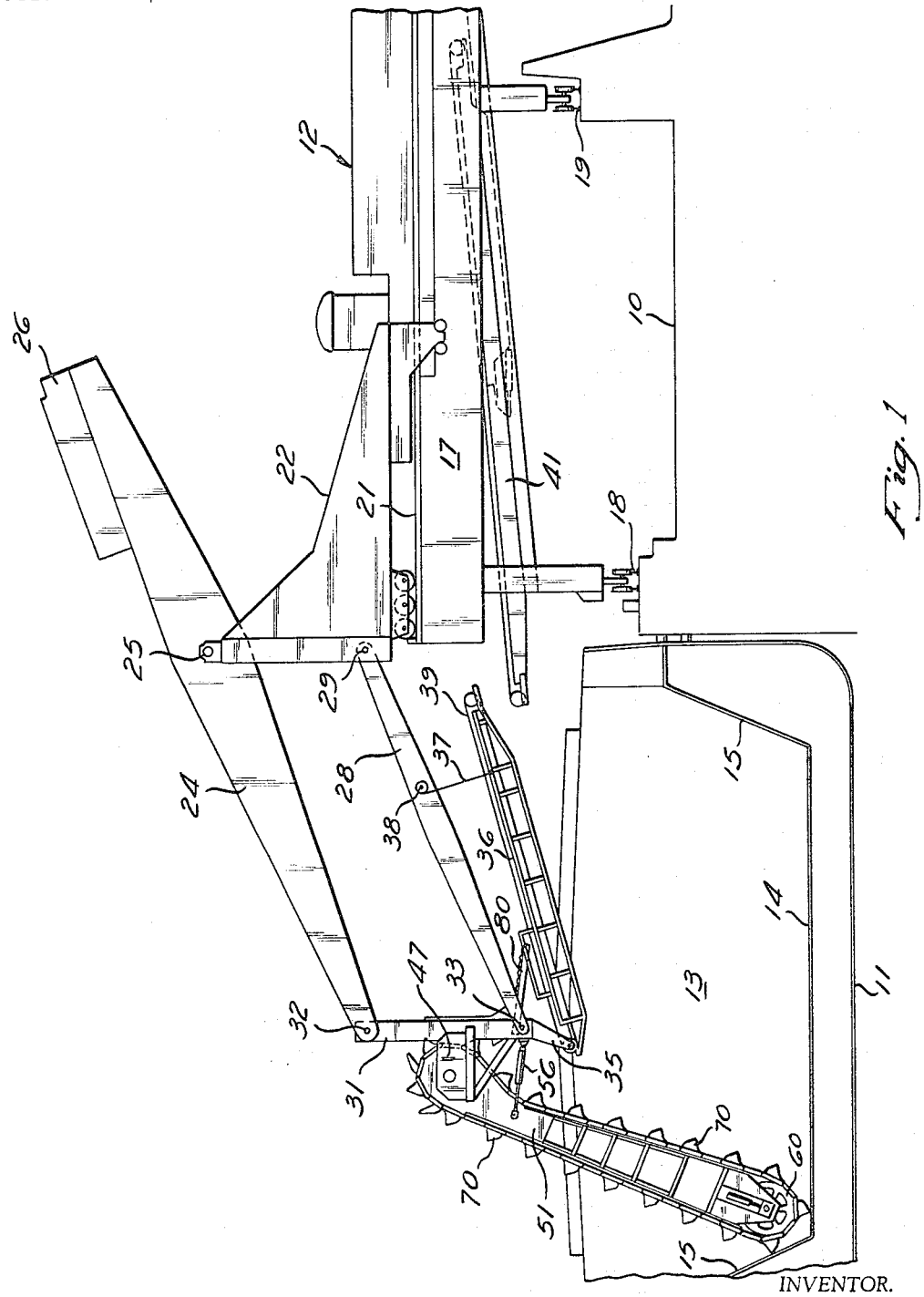
FIGURE 1 is a side elevational view of a Hulett type unloader modified to incorporate a bucket chain conveyor leg embodying the present invention.

Referring now to the drawings in greater detail, FIGURE 1 shows a dock indicated generally at 10 at which is moored a bulk cargo ship 11 being unloaded by a Hulett type unloader 12, modified in accordance with the present invention. The ship 11 has a hold 13 defined by the tank top 14 and sidewalls 15.

The Hulett type unloader is shown only generally since its structure apart from the bucket chain conveyor leg of the present invention is well known and except as described herein forms no part of this invention. The unloader includes a gantry or bridge 17 which is mounted on a front rail 18 and rear rail 19 for movement along the dock 10 to allow movement lengthwise of the ship both within each hold and for movement from one hold to the next in the event that it is not desired to shift the ship for this purpose.

The gantry 17 has a track arrangement 21 on its upper side to support a trolley 22 which provides the necessary movement across the hold from one side of the ship to the other. Mounted on the trolley 22 is an upper arm or walking beam 24 pivotally secured at 25 and having a counterweight 26 for balance purposes to offset the weight of the bucket leg on the end. A lower arm or leg brace 28 is also pivotally mounted at 29 on the trolley and a vertical leg frame 31 is pivotally mounted at 32 and 33 to the outer end of the walking beam 24 and the leg brace 28. Thus, the trolley 22, the arms 24 and 28, and the vertical frame 31 define a parallelogram linkage to insure that the vertical frame 31 remains in a vertical position at all times during vertical movement.

The vertical leg frame 31 has a depending support arm 35 extending downward from its lower end beneath the lower pivot 33 which serves to support one end of an outer conveyor 36 which operates to transport material back toward the gantry 17. At its inner end, the conveyor 36 is supported by means of a cable 37, the other end of which is wound on a hoist drum 38 so that the inner end of the conveyor 36 can be raised and lowered as required with the different positions of the upper and lower arms 24 and 28 both for storage and to insure efficient transfer of the material from the outer conveyor 36 to the inner conveyor 41 which is mounted on the gantry 17.

As shown in greater detail in FIGURE 2, the bucket chain conveyor or elevator leg of this invention is mounted on the vertical frame 31 and depends therefrom for insertion into the hold of a vessel being unloaded. To support the bucket chain conveyor, the vertical frame 31 has an outwardly projecting horizontal beam 44 secured adjacent its midpoint, and an angular support beam 45 extends from the lower end of the vertical frame 31 to the outer end of the horizontal beam 44 to provide a rigid support. A drive mechanism 47 which contains a drive motor and gear box is mounted on the upper side of the horizontal beam 44 and provides the final drive to the sprocket shaft 49.

The ladder frame 51 is mounted on a shaft coaxial with the sprocket shaft 49 and is rotatably journaled to be supported by the beam 44 and drive mechanism 47 so that the ladder frame can rotate about the axis of the sprocket shaft 49. As shown, the ladder frame 51 extends downward a distance sufficient to reach the full depth of the holds of the vessel being unloaded and has a structural framework defined by a front edge or rail 52 and rear edge or rail 53 spaced apart by cross members 54. The entire ladder frame 51 is caused to rotate about the axis of the sprocket shaft 49 by means of tilt cylinders 56 anchored between the ladder frame 51 and the vertical frame 31 so as to hold the ladder frame in the desired angular position. Thus, it will be seen that the ladder frame can be tilted outward as shown in FIGURE 1 to reach the far side of the ship's hold and can also be tilted inward to the vertical position and through the vertical position so that its bottom end is inward of the upper end to reach re-entrant portions of the hold. Of course, to extend the reach across the ship's hold, the trolley 22 is moved along the track 21 inwardly as necessary so that all portions across the hold can be reached. Movement along the length of the ship is accomplished by having the gantry 17 move along the rails 18 and 19.

The sprocket shaft 49 is arranged to rotatably drive an upper sprocket 58 rotatably carried on the upper end of the ladder frame 51. At its lower end, the ladder frame carries a lower sprocket 60 mounted on a shaft 61 which in turn is supported by bearing blocks 62. It will be understood that although only one side of the ladder and bucket chain have been shown, that there are two spaced sprockets at both the upper and lower ends carrying separate spaced parallel chains with the buckets extending transversely between the chains.

At its lower end, the ladder frame carries a support plate 63 having a slot therein to slidably receive the bearing block 62 for vertical movement. A tensioning unit 64 is arranged to position the bearing block so as to provide proper operating tension in the bucket chain while allowing a certain amount of upward yield in the event that a bucket or the chain should accidentally strike the bottom of the hold to prevent damage by allowing the lower sprocket to shift upwardly in a yielding manner.

The bucket chains 66 are mounted to extend in an endless manner around the upper and lower sprockets 58 and 60 and are spaced apart in parallel fashion, as better seen in FIGURE 4, so as to carry buckets 70 extending transversely between the chains. To provide guidance for the chains 66, the chains are made up of links 67 carrying rollers 68 at each pivotal connection with the rollers being arranged to ride in guide tracks on the front and rear edges 52 and 53 of the chain to properly position the chain and prevent lateral movement.

While the front edge 52 of the ladder frame extends vertically so as to guide the chain on the ascending side along a path which is generally tangent to the upper and lower sprockets, the rear edge 53 is arranged so that on the descending side the chain after passing over the upper sprocket moves inwardly to a point adjacent a center line extending between the axes of rotation of the upper and lower sprockets. This gives the chain a reverse bend at 72, immediately below the upper sprocket, and to accomplish this a guide rail portion 73 is secured to the rear edge of the ladder frame so as to prevent outward movement of the rollers and hold them in contact with the tracks on the rear edge 53. This arrangement allows the outer conveyor 36 to extend beneath the buckets when they are in dumping position, when the bucket ladder frame is in the vertical position or even when tilted inwardly so that the lower sprocket is inward of a vertical line from the upper sprocket.

Since the buckets 70 are rigidly secured at several spaced points on the same link on the bucket chains and are mounted on alternate links, it will be seen that the attitude or angular orientation of the bucket is determined by the attitude of the link and as the links pass around the sprockets, the buckets will pass through a change in angular position corresponding to the change in angular position of the link. Normally, this would result in the buckets, if full or nearly so, tending to discharge the material they contain when they approach the top center position of the upper sprocket 58. To overcome this problem, the upper sprockets 58 carry a plurality of fixed buckets or scoops 75 mounted between the sprockets and having a width substantially equal to the width of the chain buckets 70. These sprocket buckets 75 are rigidly secured to the upper sprockets 58 in such a manner that they extend radially between the adjacent chain buckets as the chains pass around the upper sprockets. Their shape and arrangement is such that as a chain bucket 70 reaches the top center position as shown at 70a in FIGURE 2, the sprocket bucket 75a is tilted at an angle to be open upwardly so that material tending to be discharged from the chain bucket 70a passes into the sprocket bucket 75a which receives the material and prevents it from spilling. As the cooperating chain and sprocket buckets come to the downward position, the material will then be completely discharged from the bucket as shown at 70b and will begin to discharge from the sprocket bucket at 75b which then additionally acts as a guide or chute to direct the discharging material downwardly at a relatively steep angle where it can be received in a controlled manner with a minimum of spillage. Thus, the sprocket buckets 75 allow the chain buckets 70 to be rigidly secured to the links of the bucket chain for effective digging and allow the digging to be carried on in such a manner that the chain buckets can be almost completely filled yet discharge in a controlled manner to prevent the spilling which would result from premature tilting of the chain buckt 70 at the top center in the absence of the sprocket buckets 75.

To guide the bulk material as it is discharged from the sprocket buickets 75, a deflecting plate 77 is mounted on the vertical frame 31 to deflect the material discharged from sprocket buckets 75 vertically downward into an angularly disposed chute 78 from which the material passes onto a roller conveyor 80 secured to the lower end of the vertical frame 31 and arranged to direct the material downwardly and rearwardly onto the belt 39 of the outer conveyor 36. The roller conveyor 80 has a plurality of parallel driven rollers 81 having their axes spaced apart by a distance only slightly greater than their diameter so that bulk material of pellet or chunk size is conveyed along the rollers and will not pass through the openings in the roller conveyor. Any fines which pass between the rollers 81 fall downward, but because the outer conveyor 36 extends outwardly beyond the outer end of the roller conveyor 80, this fine material will merely fall onto the outer conveyor belt 39 and pass upwardly where the coarser material will land on the belt at a rearward position. This arrangement smoothes out the intermittent surge-like discharge from the buckets 75 in a manner so that the belt 39 will not be overloaded at any point in a manner which might cause spillage. The material is thus generally uniformly distributed along the outer conveyor 36 which then transfers the material to the inner conveyor 41 from which it may be transferred to other conveyors, storage bins, or railroad cars, as desired.

An alternative mounting for the bucket ladder is shown in FIGURE 3 in which a vertical frame 85 is mounted between the upper and lower arms 24 and 28 in the same manner as the vertical frame 31. At its lower end, the vertical frame 85 has a depending arm 87 arranged to support the outer conveyor 36 in the same manner as the previously described embodiment. The vertical frame 85 at its lower end opposite the pivotal attachment point for the lower arm 28 has a horizontally extending arm 88 carrying a pivot shaft 89 which supports the bucket ladder frame 90 at a point adjacent the reverse bend in the chain a distance below the upper sprocket. Other than the point of support, the ladder frame 90 and the remaining portions of the bucket ladder are identical with that of the embodiment shown in FIGURES 1 and 2, and suitable tilt cylinders (not shown) may be employed between the frame 90 and the vertical frame 85 for effecting the tilting movement of the bucket ladder.

In this arrangement, it is possible for the discharge deflectors and chutes to be arranged in a slightly different manner. A support arm 92 projects rearwardly and downwardly from the ladder frame 90 to pivotally support the outer end of a roll conveyor 94 constructed in a manner similar to the roller conveyor 80. This roller conveyor 94, since it is attached to the ladder frame at a point above the pivotal support to the ladder frame will then tend to move relative to the vertical frame 85 and conveyor 36 as the ladder pivots about the shaft 89. Accordingly, the inner end of conveyor 94 is slidably mounted on a track 95 carried on the outer conveyor 36 to accommodate this movement. Since the roller conveyor 94 is carried directly by the ladder frame, it may be mounted slightly closer to the sprocket buckets so that no deflecting plates are necessary. Accordingly, as the material is discharged from the sprocket buckets it falls directly onto the roller conveyor 94 from which it passes directly to the outer conveyor 36.

Another application of the bucket chain ladder of this invention using the bucket chain ladders in tandem is shown in FIGURES 4 and 5 as applied to a self-unloading ship. The ship 97 is of the usual construction having a plurality of holds 98 and a pair of rails 99 are mounted on the top deck 100 of the ship extending along the length of the ship on each side of the holds. A gantry 101 is mounted on the rails 99 by means of sets of trucks 102 which may be self-propelled, and from which extend upwardly a pair of spaced side frames 103. The side frames 103 are connected together at their upper ends by a pair of cross beams 105 having tracks 106 along their upper edge. A trolley 107 is supported on axles 110 having wheels 109 running on tracks 106 so that the trolley 107 can traverse the vessel from side to side across the hold so that this movement in combination with the movement of the gantry 101 along the deck rails 99 allow the buckets on the bucket ladder to reach all portions of the hold.

The trolley 107 has a pair of side frames 112 beneath axles 110 from the underside of which hang bearing brackets 114. These bearing brackets in turn support a cross axle or shaft 115 on which the upper sprockets 116 of the bucket ladder are carried. A ladder frame 118 is also supported to rotate about the axis of the shaft 115 and tilting movement is provided by the tilt cylinders 119 which are arranged to have a long stroke so that the ladder can be rotated through an angle in excess of 90°. This allows the ladder to be rotated somewhat forward from the position of FIGURE 5 and in the other direction upward to a generally horizontal position necessary to move the ladder above the coaming as it is moved from one hatch opening to the next.

At the lower end, the ladder frame carries lower sprockets 121 mounted in the manner of the lower sprockets of the ladder shown in FIGURES 1 and 2 to carry the endless bucket chains 123 carrying the buckets 124. As shown more particularly in FIGURE 4, the ladder is tandem having two complete sets of buckets with alternate spacing which serves to increase capacity as well as smooth out the load on the driving mechanism. In such an arrangement, each of the bucket chains will have two chain units with the buckets extending transversely between them together with four sprockets at the top and four at the bottom, but all of the sprockets are secured to a common shaft. On the downward side, the chains have a reverse bend 126 which takes the buckets in adjacent a point on the line between the axes of rotation of the upper and lower sprockets, and the upper sprockets carry sprocket buckets 127 cooperating with the chain buckets 124 to control the discharge of material in the manner previously mentioned. The reverse bend 126 allows the bulk material to be dumped directly downward, even if the ladder is rotated slightly clockwise from the position shown in FIGURE 5 to allow the materials to be dumped directly onto a transverse conveyor 129 carried by the gantry and discharging onto a longitudinal conveyor 131 mounted on the top deck 100 of the ship which may be used to move the material to an unloading boom or the like. Of course, as necessary various deflectors and shields may be used to control the dischage of the material from the buckets 124 and 127 onto the conveyor 129 and these deflectors may be either movable with the trolley 107 or fixed on the gantry 101.

Although several embodiments of this invention have been shown and described in detail, it is recognized that the invention is not limited to such embodiments and various modifications and rearrangements may be resorted to without departing from the scope of the invention as defined in the claims.

What is claimed is:

1. An unloader for bulk cargo vessels comprising a supporting frame, a trolley mounted on said frame for movement transverse of a ship being unloaded, upper and lower arms pivotally mounted on said trolley, a vertical frame pivotally secured to the outer ends of said upper and lower arms whereby said upper and lower arms and said trolley and said vertical frame form a parallelogram linkage to allow vertical movement of said vertical frame while retaining the vertical alignment thereof, a rigid bucket elevator ladder frame pivotally secured at its upper end to said vertical frame and arranged to extend downward into the hold of a ship being unloaded, upper and lower sprockets rotatably mounted on said ladder frame, drive means to rotate one of said sprockets, endless chain means forming a closed loop around said sprockets and including buckets carried by said chain means, guide means on said ladder frame below said upper sprocket to deflect said chain in a reverse bend inwardly to a point adjacent a line joining the axes of rotation of said upper and lower sprockets so that said chain means is in engagement with said upper sprocket for more than 180° of the periphery of said upper sprocket to allow said buckets to discharge downwardly as they pass over the top of said upper sprocket without interference from the preceding buckets when said ladder is in a substantially vertical position, and conveyor means carried on one of said arms to extend below said reverse bend to receive the material discharged from said buckets and convey it toward said trolley.

2. A bucket elevator adapted to remove bulk material from a pile to elevate it in a substantially vertical direction and discharge it in a generally downward direction comprising an elongated rigid ladder frame, including a pair of rigid guide rails supported on opposite sides of the ladder support means pivotally mounting said ladder for rotational movement at a point adjacent the upper end of the ladder frame, upper and lower sprockets rotatably mounted on said ladder frame, drive means to rotate one of said sprockets, endless chain means forming a closed loop around said sprockets and including buckets carried by said chain means on bucket links having a pair of rollers journaled therein to roll on said guide rails and to fix the relative position of said bucket with respect to said guide rails in a predetermined orientation so as to provide positive control over said buckets during digging and lifting operations, and guide means on said ladder frame below said upper sprocket to deflect said chain in a reverse bend inwardly to a point adjacent a line joining the axes of rotation of said upper and lower sprockets so that said chain means is in engagement with said upper sprocket for more than 180° of the periphery of said upper sprocket to allow said buckets to discharge downwardly as they pass over the top of said upper sprocket without interference from the preceding buckets when said ladder and said line joining the axes of rotation of said upper and lower sprockets is in a substantially vertical position, and including notches in said upper sprocket spaced about the periphery thereof to accommodate said rollers on said chain means so as to constrain the bucket chain links to a predetermined orientation substantially tangent to said upper sprocket when said buckets are driven about said upper sprocket by engagement of said rollers by said notches, and including sprocket buckets carried by said upper sprocket and arranged to cooperate with the buckets on said endless chain means to receive material discharged from said chain buckets at the top position on said upper sprocket, said sprocket buckets being constructed and arranged to prevent further discharge of the material until the buckets have rotated to a position on said upper sprocket where said sprocket bucket serves to direct the material discharged from said chain buckets in a generally downward position.

3. An unloader for bulk cargo vessels comprising a supporting frame, a trolley mounted on said frame for movement transverse of a ship being unloaded, upper and lower arms pivotally mounted on said trolley, a vertical frame pivotally secured to the outer ends of said upper and lower arms whereby said upper and lower arms and said trolley and said vertical frame form a parallelogram linkage to allow vertical movement of said vertical frame while maintaining the vertical alignment thereof, a rigid bucket elevator ladder frame, support means for said ladder frame, upper and lower sprockets rotatably mounted on said ladder frame, drive means to rotate one of said sprockets, endless chain means forming a closed loop around said sprockets and including buckets carried by said chain means, and means on said ladder frame between said upper and lower sprockets to deflect said chain inwardly to allow said buckets to discharge downwardly as they pass over the top of said upper sprocket when said ladder is in a substantially vertically position.

4. An unloader according to claim 3 wherein said means on said ladder frame below said upper sprockets comprise guide rail means on said ladder to deflect said chain in a reverse bend inwardly to a point adjacent a line joining the axis of rotation of said upper and lower sprockets so that said chain means is in engagement with said upper sprocket for more than 180° of the periphery of said upper sprocket to allow said buckets to discharge downwardly as they pass over the top of said upper sprocket without interference from the preceding buckets.

5. An unloader for bulk cargo according to claim 3 including conveyor means carried on said arms to extend below said reverse bend to receive the material discharged from said buckets and to convey it toward said trolley.

6. An unloader as set forth in claim 3 wherein said ladder is supported and pivotally mounted for rotation about an axis coaxial with the axis of rotation of said upper sprocket.

7. An unloader as set forth in claim 3 wherein said ladder is mounted for pivotal rotation about an axis parallel to and below the axis of rotation of said upper sprocket.

8. An unloader as set forth in claim 3 including conveyor means operable in the plane of movement of said endless chain means and extending beneath said upper sprockets at said reverse bend to receive material discharged from said buckets.

9. An unloader as set forth in claim 8 wherein said conveyor means includes a roller conveyor extending downwardly and away from said upper sprocket and a belt conveyor adapted to receive material of said roller conveyor and extending beneath said roller conveyor for substantially the full length of said roller conveyor.

10. An unloader as set forth in claim 3 including sprocket buckets carried by said upper sprocket and arranged to cooperate with the buckets on said endless chain means to receive material discharged from said chain buckets at the top position on said upper sprocket, said sprocket buckets being constructed and arranged to prevent further discharge of the material until the buckets have rotated to a downward position on said upper sprocket where said sprocket buckets serve to direct the material discharged from said chain buckets in a generally downward direction.

References Cited

UNITED STATES PATENTS

| 1,101,438 | 6/1914 | Hildebrand | 198—120 |
| 1,166,671 | 1/1916 | Goff | 198—142 |
| 1,357,919 | 11/1920 | While et al. | |
| 3,091,353 | 5/1963 | Allard | 214—14 X |
| 3,144,142 | 8/1964 | Wallace. | |

FOREIGN PATENTS

| 6,403,987 | 8/1965 | Netherlands. |
| 182,636 | 7/1922 | Great Britain. |

ROBERT G. SHERIDAN, *Primary Examiner.*

GERALD M. FORLENZA, *Examiner.*